(No Model.)
C. E. BUELL.
TELEGRAPHIC RELAY.
No. 251,177. Patented Dec. 20, 1881.
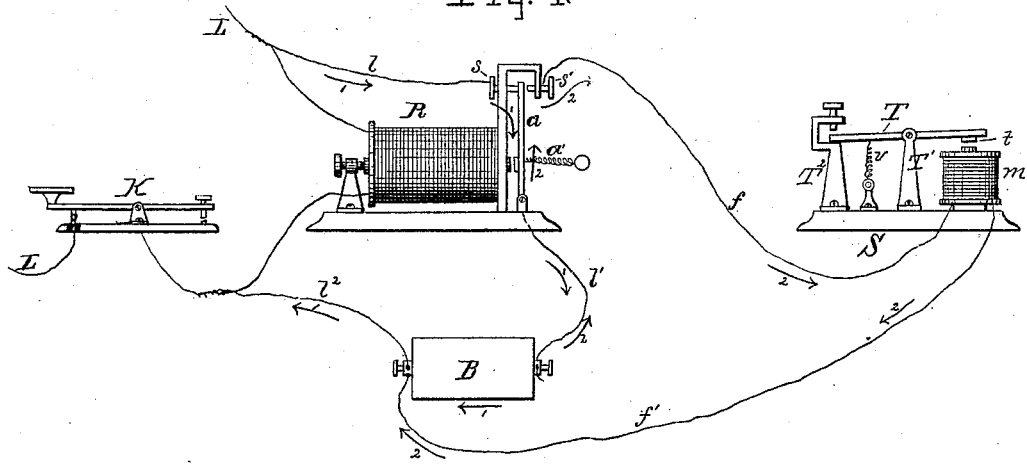
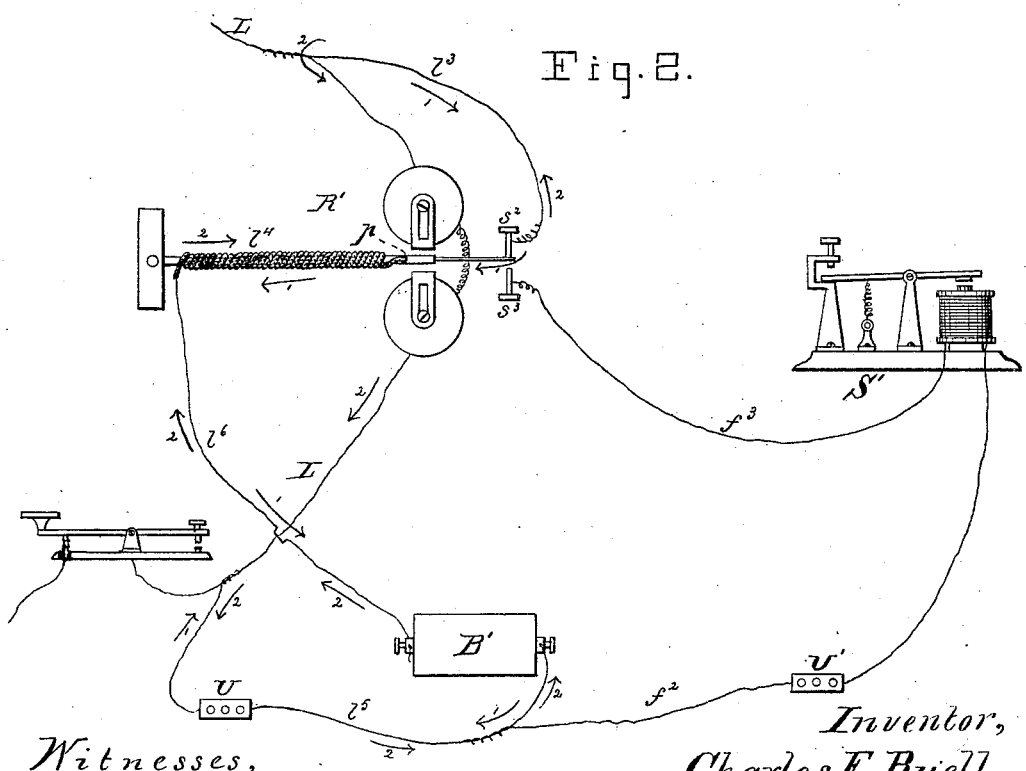
Witnesses,
Phil. W. Hale
A. A. Kane
Inventor,
Charles E. Buell,
by W. B. Hale,
Attorney.

UNITED STATES PATENT OFFICE.

CHARLES E. BUELL, OF NEW HAVEN, CONNECTICUT.

TELEGRAPHIC RELAY.

SPECIFICATION forming part of Letters Patent No. 251,177, dated December 20, 1881.

Application filed September 24, 1881. (No model.)

*To all whom it may concern:*

Be it known that I, CHARLES E. BUELL, a citizen of the United States, residing at New Haven, in the county of New Haven and State of Connecticut, have invented certain new and useful Improvements in Telegraphic Relays; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to means for operating telegraph receiving-instruments; and it consists in the combination, with a main telegraph-line and a secondary electric battery connected with said line in a manner to be charged by a current flowing therefrom to said battery, of a telegraphic receiving-instrument, a relay in the main line, and suitable connections controlled by the relay for including the receiving-instrument in a discharging-circuit of the secondary battery, as will be hereinafter particularly described.

In the accompanying drawings, Figure 1 illustrates the arrangement of circuits and instruments in a telegraph station according to my invention. Fig. 2 illustrates a modification of the same.

Referring to Fig. 1, the letter L indicates the main line, which includes an ordinary Morse relay, R; and $l$ is a wire leading from the main line to a metallic insulated front stop, $s$, of the relay, against which the metallic armature-lever $a$ strikes when the main line is closed and the relay-magnet attracts its armature. From the pivoted end of the armature-lever $a$ a wire, $l'$, leads to one pole of a secondary electric battery, B, from the other pole of which a wire, $l^2$, leads to the main line at a point on the opposite side of the relay from the junction of the wire $l$ with the main line.

The letter S indicates a sounder, the armature-lever T of which is pivoted to a post, T', and carries at one end an armature, $t$, to be attracted by the magnet $m$, while the opposite end of said lever is arranged to play between suitable stops supported by a standard, T², the lever being held against its lower stop by spring $v$. From one terminal of the coil of the sounder-magnet $m$ a wire, $f$, leads to the metallic back stop, $s'$, of the relay, and from the other terminal of said magnet a wire, $f'$, leads to the same pole of the secondary battery B, which is connected with the main line by the wire $l^2$.

The letter K designates an ordinary Morse transmitting-key connected in the main line, as usual.

The operation of the apparatus as now described is as follows: The main-line circuit being closed, the relay-magnet attracts its armature, and the metallic lever $a$ makes metallic contact with the front stop, $s$, of the relay, and thus closes a circuit composed of the wires $l$ $l'$ $l^2$, armature-lever $a$, and the metallic front stop, $s$, and as long as the main-line circuit remains closed a portion of the electric current flows from said main line over the branch leading to the secondary battery, as indicated by the arrows No. 1, passing through the secondary battery B, and charging the same. During the time the main line is closed the armature-lever T of the sounder is held against its lower stop by the spring $v$; but as soon as the main line is broken the armature-lever $a$ of the relay is thrown back by its retractile spring $a'$ against the back stop, $s'$, of the relay, thus closing a circuit which is composed of the wire $f$, stop $s'$, armature-lever $a$, wire $l'$, and wire $f'$, this circuit including the secondary battery B and the coil of the sounder-magnet $m$, so that the sounder will be operated by the current of said battery when the local circuit is closed, as it will be whenever the main line is broken by the operation of a transmitting-key, either at the same or distant station. When the current flows over the derived or branch circuit in the direction indicated by the arrows No. 1 the current from the secondary battery will flow over its discharging-circuit in the direction indicated by the arrows No. 2—that is, it leaves said battery from that pole by which the charging-current enters the same. By this arrangement it will be seen I dispense with the ordinary local electric generator and the expense and trouble of maintaining it, using instead the secondary battery, which requires scarcely any attention after being once connected for use, and which furnishes a current of great power and such uniformity that the sounder will always be vigorously operated, and require no variation of its adjustment.

In Fig. 2 I show a polarized relay, R', the polarized armature $p$ of which is mainly surrounded by a coil of insulated wire, $l^4$, which is electrically connected with it at $p$, while the opposite end of said coil is connected with one pole of the secondary battery B'. When the main line is closed the armature $p$ is attracted against a metallic stop, $s^2$, which is connected with the main line by a wire, $l^3$, in advance of the magnet, thus closing a charging-circuit composed of the wire $l^3$, stop $s^2$, armature $p$, coil of insulated wire $l^4$, wire $l^6$, the secondary battery, and wire $l^5$, which leads from said battery to the main line. Over this charging-circuit a portion of the current from the main line travels, in the direction indicated by the arrows No. 1, through the secondary battery B', storing electrical energy therein as long as the main line remains closed. When, however, the main line is broken by the opening of the key, the current immediately begins to flow from the secondary battery in the direction of the arrows No. 2—that is, over wire $l^6$, coil $l^4$, armature $p$, stop $s^2$, wire $l^3$, to the main line, and thence through the coils of the magnet and over a portion of the main line to wire $l^5$, and back to the battery. The current flowing from the secondary battery in the direction of arrows No. 2, being in the opposite direction through coil $l^4$ to that which entered it from the main line, will reverse the polarity of the armature temporarily and cause the position of the said armature to be reversed, so that it will make contact with the lower metallic stop, $s^3$, thus closing a circuit including the sounder S', and otherwise composed of wires $f^2$ and $f^3$, a portion of the wire $l^5$, wire $l^6$, coil $l^4$, a portion of armature $p$, and stop $s^3$. Thus it will be seen that the breaking of the main line by the key results in the operation of the sounder in the usual manner.

A variable resistance, as indicated at U and U', may be included in either the charging branch or the discharging-circuit of the secondary-battery circuit, but will not, however, be necessary unless a very strong secondary battery is used.

Having now described my invention and explained the operation thereof, what I claim is—

1. The combination, with a main electric circuit and a secondary electric battery connected therewith in a circuit, as described, to be charged by a current flowing from said line to the said battery, of a telegraphic receiving-instrument, a relay in the main circuit, and connections controlled by the relay for including the receiving-instrument in a discharging-circuit of the secondary battery, substantially as described.

2. The combination, with a main telegraph-line, of a derived circuit including a secondary electric battery, a relay included in the main line, an electro-magnetic telegraph-instrument connected in a discharging-circuit with the secondary battery, said discharging-circuit being arranged to be closed and broken by the relay, substantially as described.

3. In a telegraph-station apparatus, the combination, with the main line, of a relay included therein, a derived circuit including a secondary electric battery and arranged to be broken and closed by the relay, and a local circuit emanating from the secondary battery, including an electro-magnetic telegraph-instrument and arranged to be closed by the relay simultaneously with the breaking of the derived circuit, substantially as described.

4. The combination, in a telegraph-station apparatus, of a relay in the main line and sounder in an independent circuit with a secondary battery, constructed and connected as described, whereby said battery is included alternately in the main circuit and sounder-circuit by the action of the relay, as and for the purpose set forth.

5. The combination, with a main electric circuit, of a relay included therein, a derived or branch circuit which includes a secondary battery, and a variable resistance for varying the resistance of the branch circuit which includes the secondary battery.

6. The combination, with a main charging-circuit which includes a relay electro-magnet, of a branch or derived circuit which includes a secondary battery, and is formed in part by the armature of said relay, substantially as shown.

In testimony whereof I affix my signature in presence of two witnesses.

CHARLES E. BUELL.

Witnesses:
LLOYD J. CASWELL,
T. W. DENISON, Jr.